United States Patent
Calmon et al.

(10) Patent No.: US 11,025,711 B2
(45) Date of Patent: Jun. 1, 2021

(54) DATA CENTRIC RESOURCE MANAGEMENT FOR EDGE CLOUD SYSTEMS

(71) Applicant: EMC IP Holding Company LLC, Hopkinton, MA (US)

(72) Inventors: Tiago Salviano Calmon, Rio de Janeiro (BR); Ana Cristina Bernardo de Oliveira, Rio de Janeiro (BR); Flavia Coimbra Delicato, Rio de Janeiro (BR); Paulo F. Pires, Rio de Janeiro (BR); Marcelo Pitanga, Nilópolis (BR); Igor Leão dos Santos, Maracanã Rio de Janeiro (BR)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/401,604

(22) Filed: May 2, 2019

(65) Prior Publication Data

US 2020/0351337 A1 Nov. 5, 2020

(51) Int. Cl.
*H04L 29/08* (2006.01)
*G06F 9/455* (2018.01)

(52) U.S. Cl.
CPC ...... *H04L 67/1012* (2013.01); *G06F 9/45558* (2013.01); *G06F 2009/4557* (2013.01)

(58) Field of Classification Search
CPC .............. H04L 67/1012; H04L 29/08; H04L 29/08018; H04L 29/08072; G06F 9/45558; G06F 2009/4557

USPC .................................................. 709/219, 226
See application file for complete search history.

(56) References Cited

U.S. PATENT DOCUMENTS

| | | | |
|---|---|---|---|
| 10,412,118 B1* | 9/2019 | Davis | H04L 63/20 |
| 2002/0055989 A1* | 5/2002 | Stringer-Calvert | H04L 29/06 709/220 |
| 2005/0188088 A1 | 8/2005 | Fellenstein | |
| 2007/0283016 A1 | 12/2007 | Pendarakis et al. | |

(Continued)

OTHER PUBLICATIONS

Internet of Thins: Survey Atzori et al, (pp. 1-19) May 31, 2010.*

(Continued)

*Primary Examiner* — Tauqir Hussain
(74) *Attorney, Agent, or Firm* — Ryan, Mason & Lewis, LLP

(57) ABSTRACT

A resource management framework is provided for edge-cloud systems that supports heterogeneity of devices and application requirements. One method comprises obtaining an application request in a multi-tier environment comprising cloud resources and edge nodes, wherein the edge nodes host virtual nodes to process the application requests, wherein each of the plurality of virtual nodes corresponds to a given predefined virtual node type; providing data from a given data source to at least two virtual nodes based on a data type of the given data source and the virtual node type of the at least two virtual nodes; and providing a given application request to at least one virtual node based on a data type of the given application request and the virtual node type of the at least one virtual node, wherein the at least one virtual node provides data in response to the application requests to corresponding applications and/or additional virtual nodes.

20 Claims, 7 Drawing Sheets

(56) References Cited

U.S. PATENT DOCUMENTS

| | | | | |
|---|---|---|---|---|
| 2008/0180247 | A1* | 7/2008 | Deoalikar | G06K 7/0008 |
| | | | | 340/572.1 |
| 2010/0201573 | A1* | 8/2010 | Lamming | G01S 5/0289 |
| | | | | 342/451 |
| 2012/0110582 | A1 | 5/2012 | Ferdous et al. | |
| 2017/0048308 | A1* | 2/2017 | Qaisar | H04L 67/12 |
| 2017/0255491 | A1 | 9/2017 | Branshaw et al. | |
| 2018/0246558 | A1 | 8/2018 | Morad | |
| 2019/0075184 | A1* | 3/2019 | Seed, IV | H04L 67/325 |
| 2019/0101903 | A1* | 4/2019 | Katti | G05B 19/4188 |
| 2019/0319861 | A1* | 10/2019 | Pan | H04L 9/0637 |
| 2020/0167145 | A1* | 5/2020 | Franchitti | G06F 8/65 |
| 2020/0177671 | A1* | 6/2020 | Tofighbakhsh | H04L 67/1002 |
| 2020/0301741 | A1 | 9/2020 | Gabrielson et al. | |

OTHER PUBLICATIONS

U.S. Appl. No. 16/400,289, entitled, "Adaptive Controller for Online Adaptation of Resource Allocation Policies for Iterative Workloads Using Reinforcement Learning", filed May 1, 2019.

U.S. Appl. No. 16/397,596, entitled, "Adaptive Look-Ahead Configuration for Pre-Fetching Data in Input/Output Operations Based on Request Size and Frequency", filed Apr. 29, 2019.

Atzori et al., "The Internet of Things: A survey," Computer Networks, 54 (2010) 2787-2805.

Schooler et al., "Architectural Vision for a Data-Centric IoT: Rethinking Things, Trust and Clouds," In Distributed Computing Systems (ICDCS), 2017 IEEE 37th International Conference on (pp. 1717-1728). IEEE.

Bonomi et al., "Fog computing and its role in the internet of things," In Proceedings of the first edition of the MCC workshop on Mobile cloud computing (pp. 13-16). ACM, 2012.

Shi et al., "Edge computing: Vision and challenges," IEEE Internet of Things Journal, 3(5), 637-646.

Mahadev et al., "The Case for VM-Based Cloudlets in Mobile Computing, Pervasive Computing," IEEE, 8 (2009) 14-23.

Morabito et al., "Consolidate IoT edge computing with lightweight virtualization," IEEE Network, 32(1), 102-111.

Ismail et al., "Evaluation of docker as edge computing platform," In Open Systems (ICOS), 2015 IEEE Confernece on (pp. 130-135). IEEE.

Mahmud et al., "Fog computing: A taxonomy, survey and future directions," In Internet of Everything (pp. 103-130). Springer, Singapore.

Inaba et al., "Applications of weighted Voronoi diagrams and randomization to variance-based k-clustering," In Proceedings of the tenth annual symposium on Computational geometry (pp. 332-339). ACM.

Thönes, J. "Microservices." IEEE Software 32.1 (2015): 116-116.

Lewis et al., "Microservices," Available in: http://martinfowler.com/articles/microservices.html. Access in: Sep. 27, 2017.

Pahl et al., "Containers and clusters for edge cloud architectures—a technology review," In Future Internet of Things and Cloud (FiCloud), 2015 3rd International Conference on (pp. 379-386). IEEE.

Misra et al., "On Theoretical Modeling of Sensor Cloud: A Paradigm Shift From Wireless Sensor Network," IEEE Systems Journal, vol. 11, No. 2, pp. 1084-1093, Jun. 2017.

Taleb et al., "Mobile edge computing potential in making cities smarter," IEEE Communications Magazine, 55(3), 38-43.

Bouzeghoub, M., "A framework for analysis of data freshness," In Proceedings of the 2004 international workshop on Information quality in information systems (pp. 59-67). ACM.

"CEP," Available in: https://en.wikipedia.org/wiki/Complex_event_processing.

"Publish-subscribe pattern," Available in: https://en.wikipedia.org/wiki/Publish%E2%80%93subscribe_pattern.

Chatterjee et al., "Optimal Composition of a Virtual Sensor for Efficient Virtualization within Sensor-Cloud," in Proceedings of IEEE International Conferencce on Communications, Jun. 2015, pp. 448-453.

Yi et al., "A survey of fog computing: concepts, applications and issues." Proceedings of the 2015 Workshop on Mobile Big Data. ACM, 2015.

Santos et al., "Olympus: The cloud of sensors," IEEE Cloud Computing, 2(2), 48-56.

Delicato et al.,. "The Resource Management Challenge in IoT," In Resource Management for Internet of Things (pp. 7-18). Springer International Publishing (2017).

Wang et al., "ENORM: A framework for edge node resource management," IEEE Transactions on Services Computing (2017).

Skarlat et al., "Resource Provisioning for IoT Services in the Fog," 2016 IEEE 9th International Conference on Service-Oriented Computing and Applications (SOCA), Macau, 2016, pp. 32-39.

Roy et al., "DIVISOR: Dynamic Virtual Sensor Formation for Overlapping Region in IoT-based Sensor-Cloud," Proceedings of the IEEE Wireless Communications and Networking Conference, 2018.

Skarlat et al., "Optimized IoT service placement in the fog," Serv. Oriented Comput. Appl. 11, 4 (Dec. 2017), 427-443. DOI: https://doi.org/10.1007/s11761-017-0219-8 (2017).

Dautov et al., "Pushing Intelligence to the Edge with a Stream Processing Architecture," 2017 IEEE International Conference on Internet of Things (iThings) and IEEE Green Computing and Methods and Apparatus for Real-Time Anomaly Detection over Sets of Time Series—Nov. 2017 Dell EMC Confidential pp. 24 of 24 Communications (GreenCom) and IEEE Cyber, Physical and Social Computing (CPSCom) and IEEE Smart Data (SmartData), Exeter, 2017, pp. 792-799.

"Hypervisor," Available in: https://en.wikipedia.org/wiki/Hypervisor.

"EdgeX Foundry," Available in: https://www.edgexfoundry.org.

"Orion Context Broker," Available in: https://catalogue.fiware.org/enablers/publishsubscribe-context-broker-orion-context-broker.

"FIWARE NGSI Open RESTful API Specification," Available in: http://forge.fiware.org/plugins/mediawiki/wiki/fiware/Index.php/FIWARE_NGSI_Open_RESTful_API_Specification. Last accessed: Jun. 28, 2018.

"ZeroMQ," Available in: https://en.wikipedia.org/wiki/ZeroMQ.

U.S. Appl. No. 16/034,432, entitled, "Resource Allocation and Provisioning in a Multi-Tier Edge-Cloud Virtualization Environment", filed Jul. 13, 2018.

Betts, et al., "Estimating the WCET of GPU-accelerated applications using hybrid analysis," Real-Time Systems (ECRTS), 2013.

Liu et al., "Adaptive entitlement control of resource containers on shared servers," IFIP/IEEE International Symposium on Integrated Network Management, pp. 163-176, May 2005.

K. Hornik, "Approximation capabilities of multilayer feedforward networks," Neural networks, vol. 2, No. 4, pp. 251-257, 1991.

D. Merkel, "Docker: Lightweight Linux Containers for Consistent Development and Deployment," Linux Journal, vol. 2, p. 234, (2014).

U.S. Appl. No. 16/039,743, entitled, "Allocation of Shared Computing Resources Using Source Code Feature Extraction and Clustering-Based Training of Machine Learning Models", filed Jul. 19, 2018.

U.S. Appl. No. 16/259,244, entitled, Building Neural Networks for Resource Allocation for Iterative Workloads Using Reinforcement Learning, filed Jan. 28, 2019.

U.S. Appl. No. 15/941,434, entitled, "Allocation of Shared Computing Resources Using Source Code Feature Extraction and Machine Learning", filed Mar. 30, 2018.

U.S. Appl. No. 16/263,135 entitled, "Adaptive Look-Ahead Configuration for Prefetching Data in Input/Output Operations," filed Jan. 31, 2019.

U.S. Appl. No. 16/554,897, entitled, "Model-Based Initialization fo Workloads for Resource Allocation Adaptation", filed Aug. 29, 2019.

U.S. Appl. No. 16/554,910, entitled, "Early-Convergence Detection for Online Resource Allocation Policies for Iterative Workloads", filed Aug. 29, 2019.

Shi et al. "Edge computing: Vision and challenges," IEEE Internet of Things Journal, 3(5), 637-646, Oct. 2016.

Morabito et al., "Consolidate IoT edge computing with lightweight virtualization," IEEE Network, 32(1), 102-111, Jan. 2018.

(56) References Cited

OTHER PUBLICATIONS

Mahmud et al., "Fog computing: A taxonomy, survey and future directions," In Internet of Everything (pp. 103-130). Springer, Singapore, Oct. 21, 2017.
Inaba et al., "Applications of weighted Voronoi diagrams and randomization to variance-based k-clustering," In Proceedings of the tenth annual symposium on Computational geometry (pp. 332-339). ACM (1994).
Taleb et al., "Mobile edge computing potential in making cities smarter," IEEE Communications Magazine, 55(3), 38-43, Mar. 2017.
"Publish—subscribe pattern," Available in: https://en.wikipedia.org/wiki/Publish%E2%80%93subscribe_pattern, Downloaded Mar. 27, 2019.
Santos et al., "Olympus: The cloud of sensors," IEEE Cloud Computing, 2(2), 48-56, Mar. 2015.
"Hypervisor," Available in: https://en.wikipedia.org/wiki/Hypervisor, downloaded Mar. 27, 2019.
"EdgeX Foundry," Available in: https://www.edgexfoundry.org, downloaded Mar. 27, 2019.
"Orion Context Broker," Available in: https://catalogue.fiware.org/enablers/publishsubscribe-context-broker-orion-context-broker, downloaded Mar. 27, 2019.
"ZeroMQ," Available in: https://en.wikipedia.org/wiki/ZeroMQ, downloaded Mar. 27, 2019.

* cited by examiner

DATA CENTRIC RESOURCE MANAGEMENT FOR EDGE CLOUD SYSTEMS

FIELD

The field relates generally to resource allocation techniques in information processing systems.

BACKGROUND

One major challenge in emerging scenarios, such as the Cloud-assisted Internet of Things (IoT), is efficiently managing the resources involved in the system while meeting requirements of client applications. From the acquisition of physical data to the transformation of the data into valuable services or information, there are several steps that must be performed, involving the various players in such a complex ecosystem. Support for decentralized data processing on IoT devices and other devices near the edge of the network, in combination with the benefits of cloud technologies, has been identified as a promising approach to reduce communication overhead and data transfer time, thus reducing delay for time sensitive applications. The interplay of IoT, edge and cloud technologies to achieve the final goal of producing useful information and value-added services to end users gives rise to a management problem that needs to be wisely tackled.

A need therefore exists for an improved resource management framework for edge-cloud systems that supports heterogeneity of devices and of application requirements.

SUMMARY

In one embodiment, a method comprises obtaining at least one application request in a multi-tier environment comprising one or more cloud resources and a plurality of edge nodes, wherein the plurality of edge nodes host a plurality of virtual nodes to process the one or more application requests, wherein each of the plurality of virtual nodes corresponds to a given one of a plurality of predefined virtual node types; providing data from a given data source to at least two of the plurality of virtual nodes based on a data type of the given data source and the virtual node type of the at least two virtual nodes; and providing a given application request to at least one of the plurality of virtual nodes based on a data type of the given application request and the virtual node type of the at least one virtual node, wherein the at least one virtual node provides data in response to the one or more application requests to one or more of: corresponding applications and one or more additional virtual nodes.

In some embodiments, the edge nodes are grouped into a plurality of edge node groups and each edge node group comprises at least one master node, and wherein at least two master nodes from different edge node groups collaborate to identify a given edge node group that can serve a given application request.

Other illustrative embodiments include, without limitation, apparatus, systems, methods and computer program products comprising processor-readable storage media.

DETAILED DESCRIPTION

Figure 1:
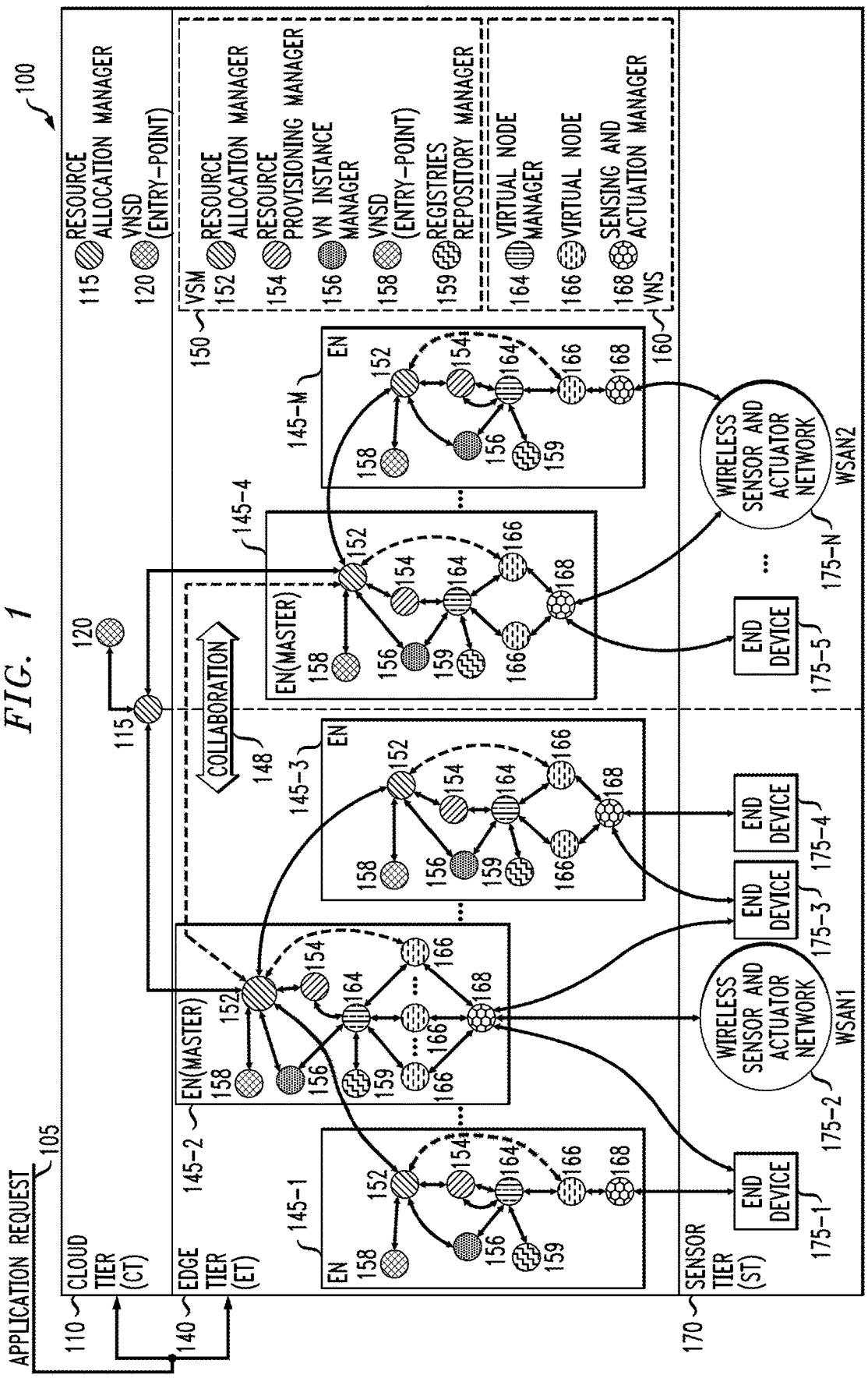
FIG. 1 illustrates an exemplary three-tier architecture in which one or more aspects of the disclosed resource management framework may be implemented for processing one or more application requests, according to at least one embodiment.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for providing a resource management framework for edge-cloud systems that supports heterogeneity of devices and of application requirements.

In some embodiments, the disclosed resource management framework manages an efficient usage of the system resources while leveraging the edge computing features, while exploring the advantages of service provision at the edge of the network, to meet low latency requirements of emerging applications. The disclosed framework, according to at least one embodiment, encompasses (i) a lightweight and data-centric virtualization model for edge devices, and (ii) a set of components responsible for the resource management and the provisioning of services from the virtualized edge-cloud resources.

Cloud computing technology has revolutionized the way that end users and enterprises gain access to computing resources, enabling the on-demand allocation and release of a wide range of services and resources. The flexibility and business model provided by the cloud computing environment make this paradigm appealing and enable other applications. Another technological trend that has been gaining momentum is IoT (see, for example, L. Atzori et al., The Internet of Things: A Survey, Computer Networks, 54, 2787-2805, (2010), incorporated by reference herein in its entirety), which enables the interconnection with the Internet of varied physical objects, often instrumented by intelligent sensors and sometimes also actuators. With the possibility of addressing each physical object individually and making each physical object part of a global network, the IoT has the potential to provide additional applications to make life easier and healthier for citizens, to increase the productivity of companies and to promote the building of more intelligent and sustainable cities, environments and countries.

One challenge with IoT is efficiently managing the resources involved in an IoT system or application. As noted above, from the acquisition of physical data to the transformation of the data into valuable services or information, there are several steps that must be performed, involving various players in a complex ecosystem. Each of these transformation processes demand resources from the system. IoT devices, such as sensor devices, have limited computing and energy resources, and thus are not able to perform sophisticated processing or store large amounts of data. Therefore, it is often necessary to rely on more powerful devices to fully perform the transformation process required by IoT applications (see, for example, Flávia Coimbra Delicato et al., "Resource Management for Internet of Things," Springer Briefs in Computer Science, ISBN 978-3-319-54246-1, 1-112 (2017), incorporated by reference herein in its entirety). With its vast capacity for processing and long-term storage, cloud computing comes hand-in-hand with IoT to create complex, large-scale, distributed, and data-oriented ecosystems. However, some features of cloud computing make it unsuitable to meet requirements of some IoT applications and other classes of emerging applications.

The essentially centralized nature of the cloud may not fit well with the inherently decentralized nature of IoT. In IoT, data is often generated from geographically distributed sources, and can be consumed by equally dispersed users, often using devices that themselves are also part of IoT. Blindly sending this distributed data for processing and storage centrally in the cloud, then forwarding it back to users near data sources, can result in unwanted delays. For some applications, response time is a critical quality requirement, and the latency and unpredictability of communication with the cloud can lead to performance degradation. In addition, many IoT devices have non-negligible computational capabilities, which can be exploited opportunistically to perform distributed and location-aware processing.

Support for decentralized data processing on IoT devices and other devices near the edge of the network, in combination with the benefits of cloud technologies has been identified as a promising approach to reduce communication overhead and data transfer time (hence the latency for applications). In this context, the conceptual approach known as Fog (see, for example, F. Bonomi et al., Fog Computing and its Role in the Internet of Things (2012), Proc. of the First Edition of the MCC Workshop on Mobile Cloud Computing, 13-16, ACM (2012), or Edge Computing (see, for example, W. Shi et al., "Edge Computing: Vision and Challenges," IEEE Internet of Things Journal, 3(5), 637-646 (2016), each incorporated by reference herein in its entirety) has emerged, which provides for moving part of the computing and storage resources needed to perform services closer to the edge of the network, in a decentralized way.

Physical edge devices are typically heterogeneous in terms of their capabilities and can be either resource-poor devices, such as access points, routers, switches, base stations, and smart sensors, or resource-rich machines, such as a "cloud-in-a-box", or Cloudlets (see, for example, S. Mahadev et al., "The Case for VM-Based Cloudlets in Mobile Computing," Pervasive Computing, IEEE, 8, 14-23, (2009), incorporated by reference herein in its entirety). Edge devices may perform several tasks, such as data pre-processing and filtering, reconstructing raw data into a more useful form, and uploading only the necessary data to the cloud. In addition, edge nodes can monitor smart objects and sensor activities, keeping check on their energy consumption. An edge device consumes locally the portion of data generated by sensors that require real-time processing (e.g., from milliseconds to tenths of seconds). Then, the edge device transmits the rest of such data to the cloud, for operations with less stringent time constraints (e.g., from seconds to minutes). Therefore, edge computing allows real-time delivery of data, especially for latency sensitive services. On the other hand, the closer to the cloud, the longer the time scale, and the wider the geographical coverage. The cloud provides global coverage and serves as a repository for data for a duration of months or years, besides allowing for more complex data analytics, based on historical data.

The interplay of IoT, edge and cloud environments to achieve the final goal of producing useful information and value-added services to end users gives rise to a management problem that needs to be properly addressed. Both cloud and edge computing strongly build on the virtualization concept. However, virtualization of devices at the edge of the network needs to follow a lighter and more flexible approach to meet the constraints and heterogeneity of devices and to exploit the specific features of these nodes. R. Morabito et al., "Consolidate IoT Edge Computing with Lightweight Virtualization," *IEEE Network*, 32(1), 102-111 (2018), incorporated by reference herein in its entirety, claims that to fully achieve the potential of edge computing for IoT, four concerns need to be addressed: abstraction, programmability, interoperability, and elasticity. In particular, for a three-tier IoT-edge-cloud architecture, it is crucial to provide simple and yet efficient configuration and instantiation methods that are independent of the technologies used by different IoT providers and cloud providers.

In one or more embodiments, a resource management framework is provided for edge-cloud systems that supports heterogeneity of devices, as well as heterogeneity of application requirements. The framework aims to manage the efficient usage of the system resources while leveraging the edge computing features, exploring the advantages of service provisioning at the edge of the network to meet the low latency requirements of emerging applications. In some embodiments, as noted above, the disclosed framework encompasses (i) a lightweight and data-centric virtualization model for edge devices, and (ii) a set of components responsible for the resource management and the provisioning of services from the virtualized edge-cloud resources.

Considering a heterogeneous edge-cloud ecosystem, built to serve multiple applications with different requirements, including latency sensitive IoT applications, the need arises to provide a framework to manage the available resources in an efficient and cost-effective way. One issue associated with this problem is the allocation of the available resources in the heterogeneous edge-cloud system in order to accommodate the requirements posed by multiple applications.

At first glance, this issue is similar to the typical resource allocation problem, which has been exhaustively studied in several areas of computing systems. However, resource allocation for edge-cloud heterogeneous systems with, respectively, heterogeneous requirements of diverse applications poses new challenges that call for new solutions, tailored for such an emerging scenario. Examples of specific features are the heterogeneity of the participant devices (from small sensors to middle-tier gateways to powerful data center nodes), the highly dynamic execution environment, and the nature of the data generated by IoT devices (often data streams that require online processing and sometimes application-specific decisions).

The complexity in the development of solutions for resource allocation in the edge-cloud environment have attracted the attention of researchers in search of efficient computational solutions to meet the requirements of emerging applications (e.g., low latency, mobility, energy efficiency and scalability) envisioned to execute on such scenarios. See, for example, F. Bonomi et al., referenced above, and/or Shanhe Yi et al., "A survey of fog computing: concepts, applications and issues." *Proc. of the* 2015 *Workshop on Mobile Big Data*, ACM (2015), each incorporated by reference herein in its entirety. Solutions for resource management, including resource allocation and provisioning, are well established in the Cloud computing field. However, in the context of Edge and Fog computing, there are still many open issues in this regard. See, for example, I. Santos et al., "Olympus: The Cloud of Sensors," IEEE Cloud Computing, 2(2), 48-56 (2015); F. C. Delicato et al., "The Resource Management Challenge in IoT," Resource Management for Internet of Things, 7-18, (Springer International Publishing, 2017); and/or N. Wang et al., "ENORM: A Framework for Edge Node Resource Management," IEEE Transactions on Services Computing (2017), each incorporated by reference herein in its entirety. According to N. Wang et al., there are no distributed computing frameworks that fully and properly manage edge node resources.

Resource management is a key issue to deal with the diverse nature of resources encompassed in an edge-cloud system and to optimize the overall system performance. Providing effective solutions to this challenge will bring benefits on the one hand, to end users and on the other hand, to infrastructure providers and device owners. In this context, the disclosed techniques for resource management in edge-cloud systems are provided.

In the edge-cloud environment, multiple devices with different processing capabilities typically exist and can collaborate to meet the goals and requirements of a given application. Powerful computers, such as those hosted in the cloud, can rely on legacy virtualization technologies without major issues, but devices in the lower tiers might get their performance impacted critically with these technologies. It is important, then, to consider the heterogeneity of devices in the design of the virtualization engine. Specifically, the resource-constrained nature of several types of devices at the edge tier need to be taken into account in any solution for virtualization and resource management. Due to resource constraints from edge devices compared to data centers in the cloud, multiple edge devices often need to somehow collaborate so as to accomplish intensive application tasks by sharing the workload between themselves. The resource management framework, supported by its virtualization model, must enable such a collaboration in a natural way.

In addition to the high heterogeneity of devices, multiple applications with different functional and non-functional (Quality of Service (QoS)-related) requirements can co-exist using resources from the same underlying infrastructure. Some applications in this environment might be more computationally intensive, whereas others might have low latency requirements, for example. Moreover, several applications have severe restrictions on data security. Data generated by the devices of users often contain personal information, such as photographs and/or videos taken by mobile phones, global positioning information on the user location, health information sensed by wearable devices, and smart home status. Processing and storage of sensitive data must be handled carefully to avoid privacy issues. The decision of placing a given service in one computational node (located at the edge of the network or the cloud, for instance) must take into account the requirements of the specific applications such node is serving, and might even be influenced by the other services running in the same infrastructure. A resource management framework must be able to handle different kinds of applications with different (and sometimes even conflicting) requirements.

Edge-cloud ecosystems are complex environments encompassing many heterogeneous components. One major component of the ecosystem is the myriad of devices acting as data sources. Considering the increasing availability of smart sensors, mobile phones, wearable and other IoT devices, the resulting system may encompass hundreds to millions of connected devices, producing a massive amount of data to be processed and stored. Therefore, any solution for resource management must be scalable in terms of the number of computational nodes and the number of application requests to be served. The ultra large scale of systems brings several challenges mainly regarding the coordination of the nodes actively engaged in providing the required resources to meet the application requests. It is important to mention that several authors (see, for example, R. Dautov et al., "Pushing Intelligence to the Edge with a Stream Processing Architecture," 2017 IEEE Int'l Conf. on Internet of Things (iThings) and IEEE Green Computing and Communications (GreenCom) and IEEE Cyber, Physical and Social Computing (CPSCom) and IEEE Smart Data (SmartData), Exeter, 792-799 (2017), incorporated by reference herein in its entirety) point out that a considerable deficiency in current works in the area of edge computing is the lack of support for collaborative computation.

The current overabundance of data, generated by various emerging applications, such as social media and IoT, has caused several changes in how such data should be processed and stored. Data generated by embedded sensors and applications running on mobile devices in personal spaces of users may not necessarily be sent blindly to the remote cloud. There are new demands to shepherd data within and across multiple tiers from the edge of the network, through the core to the super data centers in the cloud. Data may be shared, pre-processed and cached in local nodes and/or edge nodes and then may transit to other tiers of the infrastructure while being used, reused, combined and re-purposed to derive value-added information, and analytical insights en route to being consumed and to possibly be archived. See, for example, E. M. Schooler et al., "An Architectural Vision for a Data-Centric IoT: Rethinking Things, Trust and Clouds," 2017 IEEE 37th Int'l Conf. on Distributed Computing Systems (ICDCS), 1717-1728, (June 2017), incorporated by reference herein in its entirety.

Processing in these multiple tiers needs to take advantage of node heterogeneity and take into account the dynamism of the execution environment, while also considering the content of the data itself in decision-making tasks. The execution of application-specific functions, data fusion procedures, and knowledge extraction can occur at various points along the path between the data source and the remote cloud. Sometimes results can be taken en route, without even requiring additional forwarding to the cloud. For this, the content of the data has fundamental value in decision-making and intermediate processing. Furthermore, a piece of data might be re-used by several applications in different contexts, and placed in different nodes.

In short, the data needs to be raised to "first-class citizens" in these emerging ecosystems. Therefore, virtualization solutions for such environments must be data-centric. Not only features like virtual machines and processing cores, commonly used in traditional virtualization models, but the data itself, its metadata and handling functions, need to be virtualized. Moreover, virtual nodes created with this data-centric view should be placed on distributed physical nodes across multiple tiers, and not just at the cloud.

To address the aforementioned challenges, the disclosed resource management framework is provided, comprising, in some embodiments, a software framework encompassing (i) a light data-centric virtualization model for edge-cloud systems, and a set of components responsible for: (ii) resource management and (iii) provisioning of services using the virtualized edge-cloud resources.

Lightweight Virtualization Model

In one or more embodiments, a lightweight data-centric model, comprising a data-centric virtualization model for edge-cloud systems is provided for the Edge-Cloud environment. One goal of the disclosed lightweight data-centric model is to offer a lightweight virtualization on top of physical sensor and actuator nodes (PSAN), of Edge nodes (EN) and of Cloud Nodes (CN). This model is supported by the three-tier architecture for edge-cloud systems mentioned above.

Three-Tier Architecture

FIG. 1 illustrates an exemplary three-tier architecture 100 in which one or more aspects of the disclosed resource management framework may be implemented for processing one or more application requests 105, according to at least one embodiment. The disclosed exemplary lightweight data-centric model uses a set of different techniques for the creation of virtual nodes. In some embodiments, six built-in, predefined types of virtual nodes are initially provided, as discussed further below in conjunction with FIG. 2.

As shown in FIG. 1, the exemplary three-tier architecture 100 is comprised of three tiers: (i) a Cloud tier (CT) 110, (ii) an Edge tier (ET) 140, and (iii) a Sensor (or data source) tier (ST) 170. The CT 110 comprises a plurality of cloud nodes (CN) (not shown in FIG. 1), and the ET 140 comprises a plurality of edge nodes (EN) 145-1 through 145-M. The CT 110 and the ET 140 host the physical devices of the ET and CT, respectively. The CNs and ENs 145 are typically virtualized using traditional models for cloud and edge virtualization. The CNs and ENs 145 have properties such as processing speed, total memory, bandwidth and geographical location. However, there are some important differences between the CNs and ENs 145. ENs 145, for example, are typically less powerful devices than CNs, regarding the resources available (e.g., memory capacity). In addition, the ENs 145 tend to be geographically closer to the data sources (for instance, sensors and IoT devices) than the CNs. Another difference is the centralized nature of the CNs at the Cloud tier 110, while the ENs 145 are typically decentralized entities and may leverage distributed and collaborative computing. The distributed nature and the proximity of the data sources make it possible to exploit context and location-awareness capabilities in the edge tier 140. Thus, instead of providing resources from a centralized and remote infrastructure, one can explore the provision of resources regionally distributed, either closer to the data source, the data consumer, or both. This feature has the potential to increase the efficiency of the usage of the infrastructure and the quality of the user experience with the services provided.

In one or more embodiments of the disclosed architecture, collaboration 148 among edge nodes and location-awareness features are actively promoted. The nodes in the edge tier 140 are grouped in a hierarchical fashion, with both vertical and horizontal communication/collaboration possible within the system. See, for example, R. Mahmud et al., "Fog Computing: A Taxonomy, Survey and Future Directions," Internet of Everything, 103-130 (Springer, Singapore, 2018), incorporated by reference herein in its entirety. To reach this goal, the ET 140 is divided into groups of ENs 145 (with a master node and slave nodes in each group of ENs 145) in some embodiments using a space splitting algorithm using location and available resources information. In at least one embodiment, such an algorithm can leverage information from the Weighted Voronoi Diagram (WVD). See, for example, M. Inaba et al., "Applications of Weighted Voronoi Diagrams and Randomization to Variance-Based k-Clustering," Proc. of the $10^{th}$ Annual Symposium on Computational Geometry, ACM, 332-339 (1994), incorporated by reference herein in its entirety. Then, each group is organized in a hierarchical structure using another appropriate algorithm. In some embodiments, this algorithm may use information about the graph or sub-graphs generated by splitting the space into regions.

In the hierarchy of FIG. 1, the master nodes (e.g., master edge nodes 145-2 and 145-4) in each group of ENs 145 are responsible for engaging slave edge nodes 145 to serve an application request. In one or more embodiments, the master edge nodes 145-2 and 145-4 are organized in a neighborhood in order to enable the collaboration 148 among the master edge nodes. Thus, the master edge nodes 145-2 and 145-4 can perform a collaboration process 148 with each other to identify a group of edge nodes 145 that can serve the application request. With such hierarchical and geographical organization of the nodes 145, it is possible (i) to facilitate the collaboration 148 between the edge nodes 145, and (ii) to assign physical nodes (at the Sensor Tier 170) to edge nodes 145 that are closer to the physical nodes, thus minimizing the consumption of resources with data and control messages, since communications are within a limited geographic region.

Finally, the ST 170 encompasses a plurality of constrained end devices 175-1 through 175-N (e.g., sensors and other IoT devices or groups of such sensors and other IoT devices) deployed over a geographic area comprising the data sources for the edge-cloud system. Each end device 175 is typically heterogeneous regarding processing speed, total memory, and energy capacity. In addition, end devices 175 in the ST 170 can provide sensing data and/or performing actuation tasks over a region. Examples of grouped devices are wireless sensors grouped to compose Wireless Sensor and Actuator Networks (WSANs) (e.g., 175-2 and 175-N), and smart devices such as smart phones and smartwatches.

Figure 2:
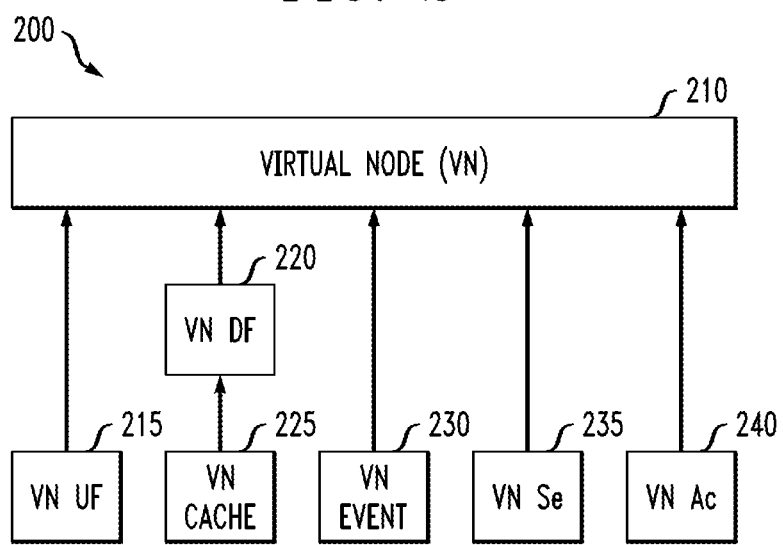
FIG. 2 illustrates an exemplary set of virtual node types for a virtual node in further detail, according to at least one embodiment.

In the considered architecture, at least one CN is assumed to be responsible for hosting a Virtual Node Service Delivery (VNSD) 120. The exemplary VNSD 120 is an entry point to receive user requests. Also, the CN hosting the VNSD 120 is responsible in some embodiments for hosting a centralized version of the disclosed Resource Allocation process. The edge nodes 145 provide computational units organized in two sub-systems, namely, a Virtualization Sub-system Manager (VSM) 150 and a Virtual Node sub-system (VNS) 160. In the embodiment of FIG. 2, the VSM 150 encompasses a resource allocation manager (ResourceAllocationMgr) 152, a resource provisioning manager (ResourceProvisioningMgr) 154, a virtual node instance manager (VNInstanceMgr) (VNIR) 156, a VNSD 158 and a registries repository manager (RegistriesRepositoryMgr) 159, whereas the exemplary VNS 160 includes a Virtual Node Manager (VNM) 164, a Virtual Node 166 and a sensing and actuation manager (Sensing&ActuationMgr) 168. In some embodiments, units 164, 166 and 168 handle user requests by performing tasks to provide sensing data or perform actuations on the physical environment.

As noted above, in some embodiments, six built-in, predefined types of virtual nodes are initially provided. FIG. 2 illustrates an exemplary set of virtual node types 200 for a virtual node 210 in further detail, according to at least one embodiment. As shown in FIG. 2, the exemplary types of VNs 200 comprise a VN for user functions (UFs) 215, a VN for data fusion (DF) 220 and a VN for caching (Ch) 225, a VN for events (Ev) 230, a VN for sensing (Se) 235, and a VN for actuation (Ac) 240, as discussed further below in the section entitled "Virtualization Model."

In one or more embodiments, each Data Type (DT) is considered to be unique, and several VNs can provide data of the same data type. Moreover, the output data of a VN is of a single data type. The Service Providers (SePs) define and describe the data types available in the system and provide them in a catalogue, or by other means. In some embodiments, the data type can be considered a non-negotiable requirement. Several VNs that provide the same data type are alternatives to meet a request. Data freshness, however, is a negotiable requirement. Ideally, each VN should update its data upon its allocation to each application request, in order to meet all requests with best (zero) data freshness. However, data updates require the VN to coordinate the engagement of the underlying physical sensor nodes, thus incurring a given processing load on it. Besides consuming energy and bandwidth resources, the execution of a data update procedure has a delay for meeting the request.

This delay is divided into two parts. The first delay is with respect to accomplishing a processing load necessary for data acquisition, and the respective time for completing this first part can vary as a function of the number of processors dedicated to the VN. The second delay is with respect to a fixed amount of time, during which the collection of data must occur.

For data types that describe a signal, or a multi-sample data, s is set to a sampling rate described by the data type t. There is a waiting time also described by the type t (or an equivalent number of samples at the given sampling rate) while several samples are collected in sequence. After this time, the data has maximum freshness (zero seconds). Then, a processing may occur to make the data ready within the VN, including, for example, filtering, parsing and insertion of this data in a database. Therefore, by the end of the data update procedure, the data freshness will have been delayed. Both the processing due to the output data type and the request procedure incur delays.

It is noted that since the exemplary lightweight datacentric model is built for extensibility, new data types can be defined and incorporated in the model, as would be apparent to a person of ordinary skill in the art. A new data type is created by extending an available virtual node super-class into the framework core library and template files to configure the data type.

Virtualization Model

The concept of virtualization is commonly adopted to hide heterogeneity and complexity of resources to be provided, thus facilitating their management and utilization. An important idea of virtualization in an edge-cloud system is to abstract away "physical resources," which can then be "composed" at a logical level to support usage by multiple independent users and even by multiple concurrent applications.

As with traditional cloud platforms, edge computing is also strongly built on the virtualization concept. However, virtualization of resources at the edge tier needs to follow a lighter and more flexible approach to meet the constraints and heterogeneity of devices and to exploit the specific features of these nodes.

Moreover, for emerging applications, such as IoT, besides processing, storage and bandwidth capacities, a valuable resource is the sensing data produced by the IoT devices. Therefore, first-order entities in a virtualization process are no longer just virtual machines and computational cores, but also sensing data (raw or in different processing states). An edge-cloud virtualization model that addresses such applications needs to take this data-driven nature into account as well.

To meet the requirements of being lightweight, the proposed virtualization model is based on microservices and container technology. More specifically, for the specification of the disclosed virtualization model, an approach is employed in some embodiments based on microservices (see, for example, J. Thönes, "Microservices," IEEE Software 32.1, 116 (2015); and/or J. Lewis and M. Fowler, Microservices (Mar. 25, 2014), downloadable from martinfowler.com, each incorporated by reference herein in its entirety) and for the implementation of this model a container-based solution is adopted. See, for example, C. Pahl, and B. Lee, "Containers and Clusters for Edge Cloud Architectures—a Technology Review," 2015 3rd Int'l Conf. on Future Internet of Things and Cloud (FiCloud), 379-386, IEEE (August 2015); and/or B. I. Ismail et al., "Evaluation of Docker as Edge Computing Platform," 2015 IEEE Conf. on Open Systems (ICOS), 130-135, IEEE (August 2015), each incorporated by reference herein in its entirety.

Generally, microservices are small, highly decoupled applications, typically built for a single responsibility. They are independently deployable, scalable, and testable and they communicate with each other using well defined application programming interfaces (API). In turn, the container-based approach can be defined as a lightweight virtualization technology for packaging, delivering and orchestrating both software infrastructure services and applications, aiming at increasing interoperability and portability.

The motivation for using microservices in the context of this invention is to allow the development of independent and lightweight-components for running on the edge nodes. Containers are used herein to package such components in lightweight-images, thus facilitating their distribution and managing.

Moreover, another relevant feature of containers is to facilitate their migration between computational nodes (e.g., in the context of this disclosure, between edge nodes). See, for example, T. Taleb et al., "Mobile Edge Computing Potential in Making Cities Smarter," IEEE Communications Magazine, 55(3), 38-43 (2017), incorporated by reference herein in its entirety. Component migration is an important feature for many applications, mainly in the presence of mobile nodes, since the edge nodes serving an application running in the mobile device may become too far to meet the required delay.

To meet the requirement of being data-oriented, and thus more tailored for IoT applications, in some embodiments, data is the core entity for creating the virtual nodes in the proposed virtualization model. As noted above, several types of virtual nodes are defined herein that represent data-driven resources to be provided by the edge-cloud infrastructure. Applications access the resources provided by our three-tier architecture through the virtualization model.

The virtual node (VN) 210 is a central element of the model. In the disclosed lightweight data-centric model, the VN 210 is a software instance providing data in response to application requests directly at the edge of the network. Also, the VN 210 is responsible for abstracting the computation and communication capabilities provided by a set of underlying nodes. Moreover, the VN 210 is optionally based on a microservice concept as it is small, high decoupled, and performs a single responsibility. Thus, each virtual node 210 is designed to implement one data type. Therefore, the disclosed model already provides predefined types of VNs for the data types provided.

A virtual node 210 is formally defined as a tuple VN=(RS, GL, NT), where RS represents the resource provided by the VN; GL=(longitude, latitude) is the geographic location of interest; and NT={UF, Se, Ac, DF, Ch, Ev} is the collection of VN types described above. Resources can be of a simple type, such as Temperature or a complex type, such as the description of an event of interest (such as Fire Detection, Fire Intrusion, Rain and Target Detected).

The VN 210 of type user function (UF) allows the user to inject code for performing custom operations (e.g., application specific) over data. The VN of type sensing (Se) provides a stream of raw data sensed from the physical environment and has a set of properties p: p=(fr, sr), where fr denotes the data freshness and sr the sampling data rate. The data stream can be retrieved from historical databases maintained at the edge tier 140 or by a direct connection with the physical nodes at the sensor tier 170. The data freshness (see, for example, M. Bouzeghoub, "A Framework for Analysis of Data Freshness," Proc. of the 2004 Int'l Workshop on Information Quality in Information Systems, 59-67, ACM (2004). incorporated by reference herein in its entirety) is an important requirement which a VN must verify during the processing of the request to determine the source of the data to send to the application. For instance, if the last data delivered is in a valid range time of data freshness, the VN 210 transmits the data obtained from the cache to the application. Otherwise, fresh data is obtained using the Sensing and Actuation sub-process before forwarding the data to the application. Hereafter, each type of VN is described.

The VN 240 of type actuation (Ac) provides actuation capabilities over the physical environment and has a set of properties p: p=(op, tx), where op denotes the type of actuation function provided by the VN and tx is the frequency that the actuation command must be performed by the system.

The VN 220 of type data fusion (DF) provides value-added information through the execution of queries using a Complex Event Processing (CEP) engine (see, e.g., Wikipedia page on "Complex Event Processing") and has a set of properties p: p=(af, sn), where af denotes an information/aggregation function and sn the number of samples to be used by af. This is a powerful type of VN 210 since it allows defining application-specific functions, domain-specific functions or generic event processing functions.

The VN 225 of type cache (Ch) is a subtype of DF that adds the capability of persisting the results of af in memory. The $VN^{ch}$ has a set of properties p: p=(ts), where ts denotes the timestamp of the execution of af (that produced the data cached by $VN^{ch}$). This VN 210 is important to avoid unnecessary use of resources of an EN when several requests are received for processing the same query using the same parameters.

Finally, the VN 230 of type event (Ev) aims to notify an application or another VN 210 whenever an event of interest occurs by using a publish/subscribe communication model. (See, e.g., Wikipedia page on "Publish Subscribe Patterns"; and/or S. Tarkoma, Publish/Subscribe Systems: Design and Principles, (John Wiley & Sons; 2012, incorporated by reference herein in its entirety). $VN^{Ev}$ has a set of properties p: p=(rl), where rl denotes a rule to trigger the event.

Resource Management Framework

The Resource Management activity in cloud computing typically encompasses the resource allocation and resource provisioning, among other activities. These are two important processes that aim to ensure the operational efficiency of the entire cloud system. Proper resource allocation improves overall performance of the system and avoids different kinds of bottlenecks, that could otherwise degrade performance of the running applications.

In this context, one or more embodiments provide improved techniques for resource management in edge-cloud systems. In some embodiments, the virtualization and the resource management processes are considered in an integrated manner. One or more aspects of the disclosure recognize that the efficient and cost-effective provisioning and allocation of such resources are intrinsically entangled with the virtualization process itself, since edge-cloud ecosystems essentially provide virtualized resources. Therefore, the disclosed resource management framework provides a set of components and respective activities for the instantiation of VNs that encompass, in some embodiments, the processes for (i) resource allocation, (ii) resource provisioning, (iii) management of sensing and actuation tasks (required for task scheduling), (v) data provisioning, and (vi) collaboration.

Figure 3:
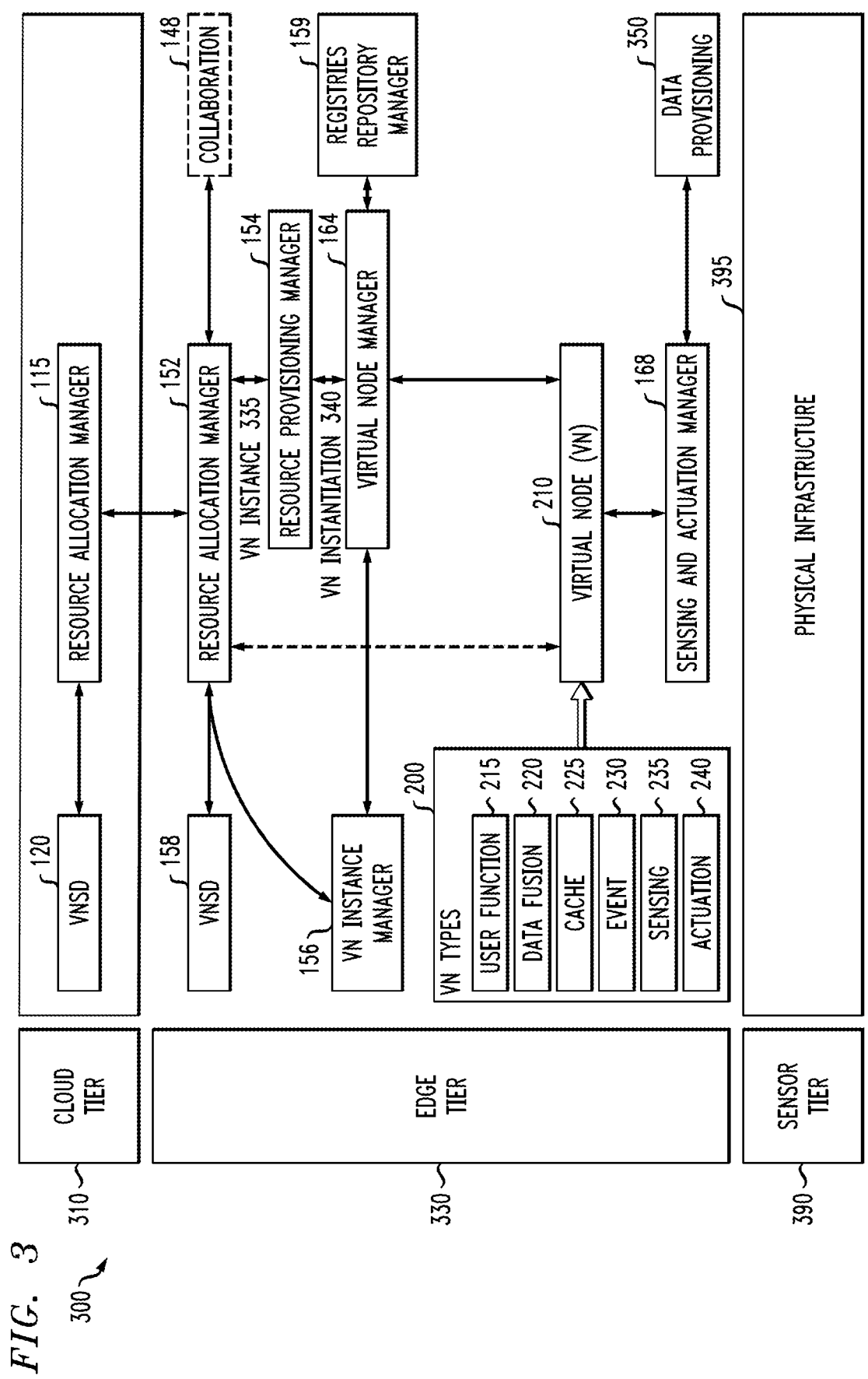
FIG. 3 illustrates an exemplary virtualization model, according to at least one embodiment of the disclosure.

FIG. 3 illustrates an exemplary virtualization model 300, according to at least one embodiment of the disclosure. As shown in FIG. 3, the exemplary virtualization model 300 comprises a cloud tier 310, an edge tier 330, and a sensor tier 390. The exemplary cloud tier 310 comprises a resource allocation manager 115 to manage a resource allocation function and a VNSD 120 as an entry point to receive user application requests.

The exemplary edge tier 330 comprises a VNSD 158 as an entry point to receive user application requests, a resource allocation manager 152 to manage the resource allocation function, and a resource provisioning manager 154 to manage a resource provisioning function. Generally, the resource allocation manager 152 allocates one or more VN instances 335 which are instantiated by the resource provisioning manager 154 as one or more VN instantiations 340.

As shown in FIG. 3, and as discussed above in conjunction with FIG. 2, the VN types 200, in some embodiments comprise VNs for user functions (UFs) 215, data fusion (Df) 220, cache (Ch) 225, events (Ev) 230, sensing (Se) 235, and actuation (Ac) 240.

End users submit their requests to the edge-cloud system using an API deployed at the Cloud or via an Edge node. The arriving requests are handled by the VNSD 120 and resource allocation manager 115 responsible for implementing the resource allocation process. When requests arrive via the Cloud tier 310, for example, a centralized version of the resource allocation manager 115 is responsible for forwarding each request to the master edge node (EN) capable of processing the request. Upon receiving the requests, the resource allocation manager 152 executing in the EN must provide a VN instance 335 to meet such requests. To do so, the resource allocation manager 152 searches in its cache of VN instances and queries all available slave nodes for a VN 210 matching the received requests. When a matching VN 210 is found, the resource allocation manager 152 forwards the request for the VN 210 to execute the tasks, thus providing the requested data/event as an outcome. However, if a VN 210 is not found, or if the available VNs 210 are busy (with other, previously received requests), then the resource provisioning manager 154 is invoked to instantiate a new VN instantiation 340.

The resource provisioning manager 154 is the component in charge of executing the action to select and prepare the underlying physical infrastructure that is capable of hosting and running a VN instance 335 (e.g., a container) matching application requests. The action of selecting physical nodes that meet the requirements of data provisioning to compose a virtual node is a mapping function. See, for example, O. Skarlat et al., "Resource Provisioning for IoT Services in the Fog," 2016 IEEE 9th International Conference on Service-Oriented Computing and Applications (SOCA), Macau, 32-39 (2016); S. Misra et al., "On Theoretical Modeling of Sensor Cloud: A Paradigm Shift From Wireless Sensor Network," IEEE Systems Journal, Vol. 11, No. 2, 1084-1093 (June 2017); S. Chatterjee and S. Misra, "Optimal Composition of a Virtual Sensor for Efficient Virtualization within Sensor-Cloud," Proc. of IEEE International Conf. on Communications, 448-453 (June 2015); C. Roy et al., "DIVISOR: Dynamic Virtual Sensor Formation for Overlapping Region in IoT-based Sensor-Cloud," Proc. of the IEEE Wireless Communications and Networking Conf. (2018); and/or O. Skarlat et al., "Optimized IoT Service Placement in the Fog," Serv. Oriented Comput. Appl. 11, 4, 427-443 (December 2017), each incorporated by reference herein in its entirety.

In one or more embodiments, the exemplary resource management framework provisions a VN 210 using the resource provisioning manager 154 to invoke the VNM 164. In some embodiments, the VNM 164 is an auxiliary component in charge of instantiating 340 the appropriate VN type 200 to meet the application request, in addition to registering the new VN instance 335 into the instance repository with the VN instance manager 156. If the resource provisioning manager 154 cannot provide the necessary resources to instantiate 340 a VN 210, the following operational decisions are executed:

(i) if the EN is a slave node and the request has arrived directly by the VNSD 158 (entry-point), the request is forwarded to its respective master node;

(ii) if the EN is a master node and the request has arrived by the point of entry or forwarded by a slave node, the master node invokes the collaboration process 148 to find a neighbor node and then, forwards the request to the neighbor master node. Whenever the collaboration process 148 is not able to find a neighbor master node to meet the request, then the request is forwarded to the centralized resource allocation manager 115 in the Cloud tier 310.

In at least one embodiment, the collaboration process 148 is responsible for enabling the cooperative work and the division of the workload to meet an application request among the edge nodes. The collaboration process 148 is available (deployed) into all the edge nodes, but only the edge nodes classified into the hierarchy as master nodes are in charge of executing the collaboration process 148. Thus, the collaboration process 148 provides, for each master edge node, the capability of decision-making to engage neighboring master edge nodes to allocate or provision VNs 210, when necessary.

There is a lack of support for collaborative computation in edge-cloud systems. See, for example, R. Dautov et al., "Pushing Intelligence to the Edge with a Stream Processing Architecture," 2017 IEEE Int'l Conf. on Internet of Things (iThings) and IEEE Green Computing and Communications (GreenCom) and IEEE Cyber, Physical and Social Computing (CPSCom) and IEEE Smart Data (SmartData), 792-799 (Exeter, 2017), incorporated by reference herein in its entirety. That is, existing approaches do not seem to consider situations when multiple edge devices can collaborate to accomplish an intensive task by sharing the workload between them. In this sense, the disclosed resource management framework fills a research gap by providing mechanisms and building blocks to promote collaboration between edge nodes.

When a VN 210 receives a request from the resource allocation manager 152 to process, the VN 210 needs to use the services of the sensing and actuation manager 168. Generally, the sensing and actuation manager 168 implements the process that manages interactions between the VNs 210 and the physical infrastructure 395 in the sensor (data source) tier 390 (e.g., data provisioning 350). The sensing and actuation manager 168 is an independent component, in some embodiments, that substantially continuously obtains data/events from the physical devices in the physical infrastructure 395 and persists the data/events into a historical database maintained at the Edge tier. The sensing and actuation manager 168 optionally abstracts the complexity of the VN 210 to deal with the highly heterogeneous devices in the physical infrastructure 395 that directly get data/perform actuations from/upon the physical environment. Therefore, the sensing and actuation manager 168 provides the services for the VN 210 to acquire sensing data and/or send actuation commands (depending on the VN type 200).

The data provided can be either preprocessed or unprocessed data. In one or more embodiments, unprocessed data is retrieved from historical databases or by directly accessing the physical nodes in the sensor tier 390 whenever fresh data is required. The processed data is provided by a CEP engine, discussed above for the VN 210 of type DF. Generally, the CEP engine is responsible for the execution of queries that make use of single or a set of raw data as input.

Furthermore, services of the exemplary sensing and actuation manager 168 that provide data to VNs 210 optionally make use of a data provisioning process. In some embodiments, the data provisioning process is responsible for abstracting the complexity of dealing with operations for the data collected from the physical devices in the sensor tier 390, data persistence, data update, data delete, and data retrieval in the historical databases.

Figure 4:
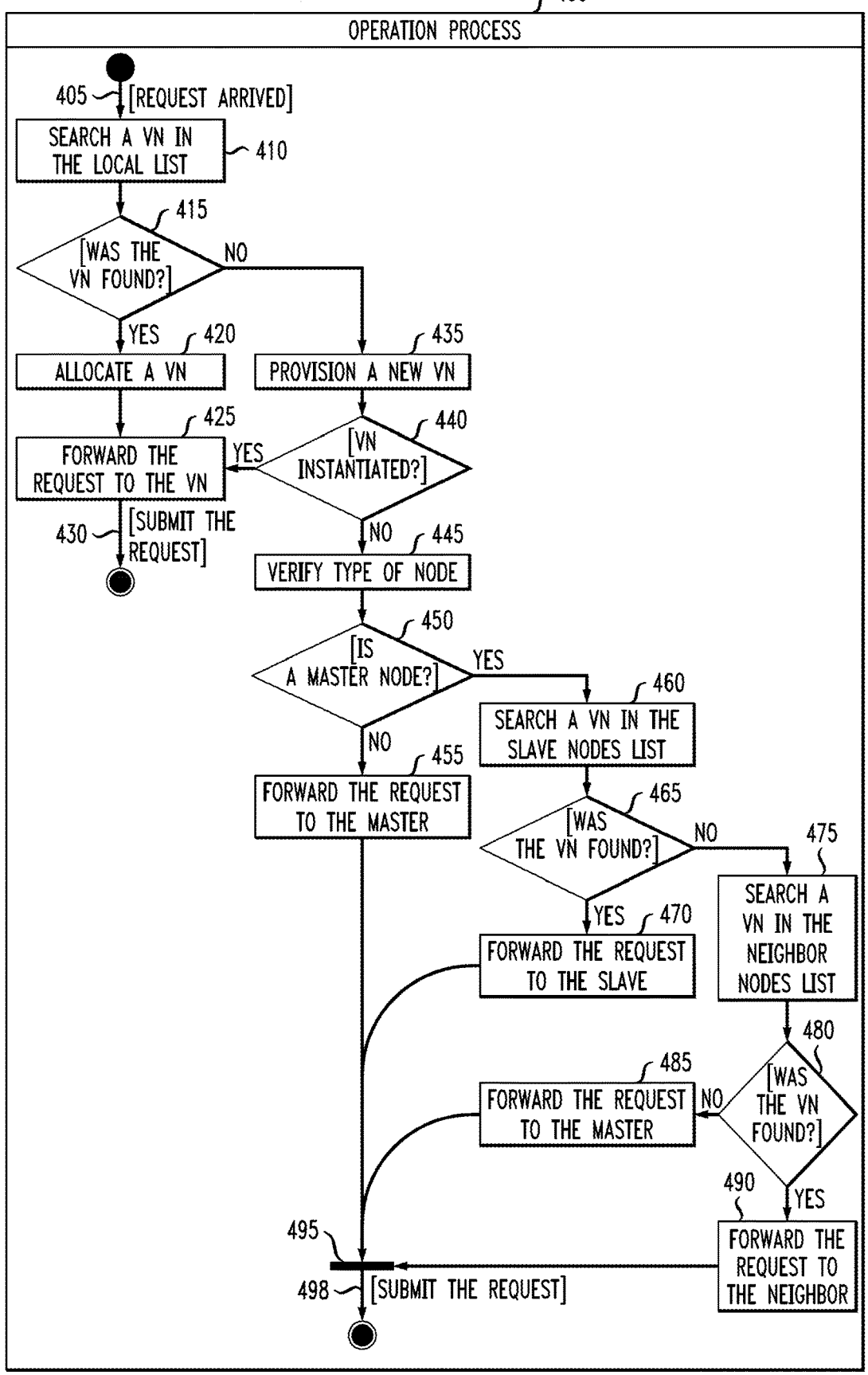
FIG. 4 is a flow chart illustrating an exemplary implementation of a resource management operation process, according to one embodiment of the disclosure.

FIG. 4 is a flow chart illustrating an exemplary implementation of a resource management operation process 400, according to one embodiment of the disclosure. As shown in FIG. 4, the exemplary resource management operation process 400 initially receives an application request 105 at step 405. During step 410, the resource management operation process 400 searches for a virtual node 210 in a local list. If the virtual node 210 was found during step 415, then the resource management operation process 400 allocates the virtual node 210 during step 420 and forwards the request 105 to the virtual node 210 during step 425. The request 105 is submitted at step 430.

If the virtual node 210 was not found during step 415, then the resource management operation process 400 provisions a new virtual node 210 during step 435, and determines if the virtual node 210 was instantiated during step 440. If the virtual node 210 was instantiated, then program control proceeds to step 425, discussed above. If, however, the virtual node 210 was not instantiated, then the resource management operation process 400 verifies the type of virtual node during step 445.

If the virtual node is not a master node (e.g., is a slave node) during step 450, then the request is forwarded during step 455 to the master node at step 495. If the virtual node is a master node during step 450, then the resource management operation process 400 searches for a virtual node 210 in a slave nodes list during step 460. A test is performed during step 465 to determine if the virtual node 210 was found in the list. If the virtual node 210 was found in the list during step 465, then the request is forwarded during step 470 to the master node at step 495, and the request is submitted at step 498.

If the virtual node 210 was not found in the list during step 465, then the resource management operation process 400 searches for a virtual node 210 in a neighbor nodes list during step 475. If the virtual node was found during step 480, then the request is forwarded to the neighbor node during step 490 and program control proceeds to step 495, discussed above.

If the virtual node was not found during step 480, then the request is forwarded to the master node during step 485 and program control proceeds to step 495, discussed above.

Software Components and their Behavioral View

Figure 5:
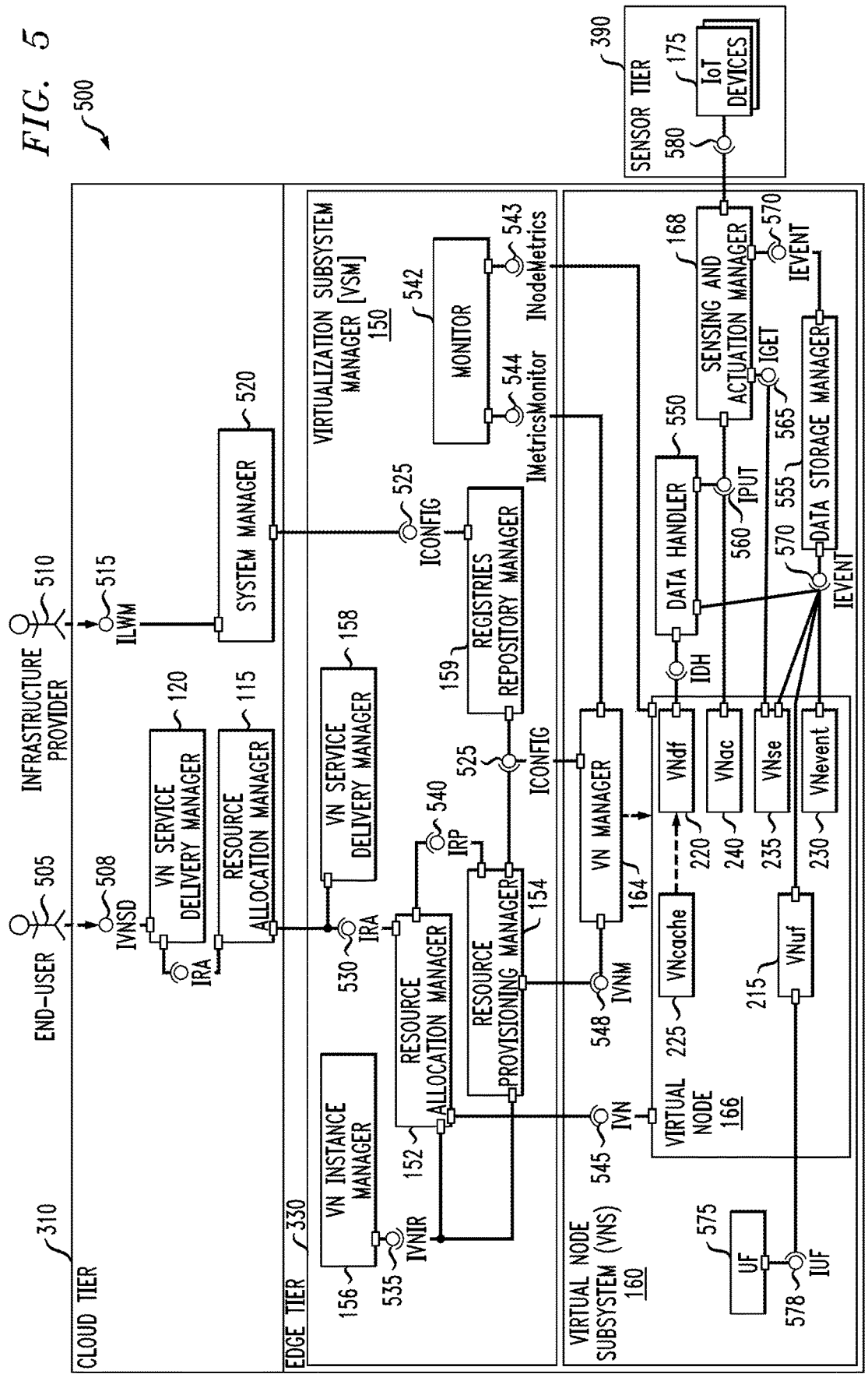
FIG. 5 illustrates components of the disclosed resource management framework, as well as the services and relationships of the disclosed resource management framework, and the tier in which they are deployed, according to some embodiments.

FIG. 5 illustrates components 500 of the disclosed resource management framework, as well as the services and relationships of the disclosed resource management framework, and the tier in which they are deployed, according to some embodiments, considering the two upper tiers (Cloud tier 310 and edge tier 330) of the exemplary three-tier architecture 100.

As mentioned above, the exemplary three-tier architecture 100 is based on a mix of microservice-based solutions (see, for example, J. Thönes, "Microservices," *IEEE Software* 32.1, 116 (2015); and/or J. Lewis and M. Fowler, referenced above, each incorporated by reference herein in its entirety) and container-based solutions (see, for example, C. Pahl, and B. Lee; and/or B. I. Ismail et al., each referenced above and incorporated by reference herein in its entirety). According to R. Morabito et al., referenced above, the container emerges as an approach that brings several benefits in an environment of high heterogeneity and resource-constraints like Edge computing. Such benefits are related to the rapid instantiation, initialization and fast resize of the resources without the overhead of restarting the system. Moreover, the use of containers facilitates the distribution and management of components on the edge nodes in contrast to other virtualization solutions, such as the hypervisor (see, for example, Wikipedia page on "Hypervisor"). In turn, the microservice is used to develop the framework components with a loosely coupled and highly cohesive design, thereby implementing a unique responsibility.

During the boot of the disclosed exemplary virtualization system, the components that encompass both the edge tier 330 (except the Virtual Node 210) and the Cloud tier 310 are loaded and initialized. It is noted that the components of both tiers 310, 330 can be loaded independently from each other. Moreover, as the components are packaged in containers in some embodiments, it is assumed that each edge node already has the container images necessary to run the VNs 210. Therefore, network overhead is avoided, since there is no need to transfer container images between edge nodes.

After the boot of the disclosed exemplary virtualization system, the sensing and actuation manager component 168 starts obtaining raw sensing data from physical elements that encompass the Sensor tier 390 and sends the sensing data to the data storage manager (DSM). The sensing and actuation manager component 168 interacts with the physical infrastructure 395, such as obtaining sensing data, performing actuation, and managing and communicating with the Sensor tier 390. The sensing and actuation manager component 168 implements a sensing and actuation process previously described. The DSM component is responsible for storing the data in a temporary database at the edge nodes, besides providing the basic operations for persistence, update, delete and retrieval data.

As shown in FIG. 5, the Cloud tier 310 comprises a virtual node service delivery manager (VNSDM) 120, a resource allocation manager 115, and a system manager (SM) 520. The SM 520 and VNSDM 120 are entry points to meet requests issued by applications via the infrastructure provider 510 and the end user 505, respectively. However, in some embodiments, the SM 520 and VNSDM 120 have specific responsibilities.

In one or more embodiments, the exemplary VNSDM 120 manages requests from end users 505 and offers a set of APIs through an Interface Virtual Node Service Delivery (IVNSD) interface 508 to allow users to: (i) request data/events to the system, (ii) send an actuation command to the VN 210 for execution, and (iii) discover registered VNs 210. A goal of the VNSDM 120 is to receive those requests that arrive at the system (either at the Cloud tier 310 or the edge tier 330) and forward them to the resource allocation manager component 115.

An implementation of the VNSD 158 is also deployed at the edge tier 330 to provide an entry point for enabling the application requests arrival directly at the tier 330 without going through the cloud tier 310. The system manager 520 provides a set of APIs through a light weight management interface (ILWM) 515. The ILWM 515 allows infrastructure providers 510 to manage the edge-cloud system and, for instance, execute a registry operation of a VN 210 by invoking the registries repository manager 159 using an IConfig interface 525.

In some embodiments, the resource allocation manager 115 deployed at the Cloud tier 310 is a centralized component that engages the master edge nodes in identifying the node (slave or master) capable of meeting the received application request. When an apt edge node is identified, the resource allocation manager 115 forwards the application request to the identified edge node. Otherwise, the request is refused.

As noted above, the components that encompass the edge tier 330 are divided into two sub-systems, namely, a Virtualization Subsystem Manager 150 and a Virtual Node subsystem 160. As shown in FIG. 5, the VSM 150 encompasses the resource allocation manager 152, the resource provisioning manager 154, a virtual node instance manager 156, a VNSD manager 158 and the registries repository manager 159, whereas the exemplary VNS 160 includes, the VNM 164, a virtual node 166 and the sensing and actuation manager 168. These units 164, 166 and 168 are responsible for handling the user requests by performing tasks to provide sensing data or perform actuations on the physical environment.

In one or more embodiments, the exemplary resource allocation manager 152 implements an algorithm that provides an instance 335 of the VN 210 to meet each application request. The exemplary resource allocation manager 152 provides a resource allocator interface (IRA) 530 used to receive requests arriving via the VNSDM 158 or forwarded by the centralized resource allocation manager 115. Upon receiving the application requests, the resource allocation manager 152 invokes the VNIR 156 using an IVNIR interface 535 to find a VN instance 335 matching the request. The VNIR 156 manages a pool of VN instances 335 in memory. When a VN instance 335 that matches the requests is not found, or if the available VNs 210 are busy (e.g., with other, previously received requests), the resource allocation manager 152 should make a decision regarding the current request. In some embodiments, the decision considers the edge node type: (i) if the edge node is a slave edge node, then the request is forwarded to its respective master edge node; (ii) if the edge node is a master edge node, then the horizontal collaboration process 148 is executed to find a neighbor master node capable of provisioning a VN 210.

A monitor 542 captures a set of metrics and provides them to the VNManager 164. The monitor 542 has two interfaces, an IMetricsMonitor interface 544 and an INodeMetrics interface 543. In one or more embodiments, the captured metrics comprise (i) specific metrics of the VN container (e.g., free memory, number of processors used, threads running, total of threads, peak of threads), obtained using the INodeMetrics interface 543; (ii) physical metrics of the edge node that hosts the container (e.g., free physical memory size, the total physical memory size and the number of available processors), and (iii) network latency to reach this node, calculated, for example, through a ping operation.

A resource provisioning manager (RPM) 154 is in charge of provisioning a new VN instance 335 whenever a new VN instance 335 is necessary. The RPM 154 provides its service through a resource provisioner interface (IRP) 540. Initially, the RPM 154 invokes the registries repository manager 159 using the IConfig interface 525 to seek a VN description that meets the application request. Then, the RPM 154 executes the action to select and prepare the underlying physical infrastructure that is capable of hosting and running a VN instance 335 according to the respective description. However, in some embodiments, there are three exceptions that should be handled: (i) if a VN description is not found (so, the application is requesting a service not currently being provided by the edge-cloud infrastructure), or (ii) if a selected edge node becomes unreachable, or (iii) if a selected edge node does not have enough resources to host and run the VN 210, then the RPM 154 is not able to proceed, so the RPM 154 sends a warning message in response to the application request. Upon finalizing the above tasks with success, the RPM 154 invokes the VNM 164 in the VNS 160 using a virtual node manager interface (IVNM) 548 to instantiate the new VN 210.

In at least one embodiment, the registries repository manager 159 provides the services to store, remove, and retrieve metadata related to the data types registered into the system by the infrastructure provider 510. The services of the registries repository manager 159 are accessed through the IConfig interface 525.

In some embodiments, the VNS 160 supports the activities related to the creation of the different types of VNs and the management of their lifecycle. The VNM 164 manages the VN life cycle. The VNM 164 is invoked by the RPM 154 every time a new VN instance 335 needs to be created or destroyed. Initially, the VNM 164 invokes the registries repository manager 159 component through the IConfig interface 525 to get the data type setting related to the request. Then, the registries repository manager 159 identifies the VN type 200 and executes the VN instantiation 340.

In one or more embodiments, the VN 210 is an abstraction used to design the six exemplary predefined types of VN components, described above in conjunction with FIG. 2 (VNuf 215, VNdf 220, VNcache 225, and VNevent 230, VNSe 235 and VNac 240), to handle the application requests. It is noted that, in an edge-cloud system, the infrastructure provider 510 will often offer its services through formal or semi-formal agreements with users. Therefore, a predefined set of virtual nodes 210 can be provided a priori to meet the potential application domains or specific applications whose contracts have already been established. Some application requirements may be met by the services of a single type of virtual node while other requirements will require combined services of multiple types. As the disclosed edge-cloud scenario is dynamic, applications may eventually arrive with requirements that are not currently met by the original set of VN types 200. Such applications may require the specification of new types, which will be extensions of the existing ones.

The VN 166 exposes the IVN interface 545 to provide its services upon receiving the requests from the resource allocation manager 152. Also, the operations of the VN 166 are supported by engaging a Data Handler 550, SAM 168 and a DataStorageManager (DSM) 555. The interaction among these components is described below, according to at least one embodiment. Generally, the Data Handler 550, SAM 168 and a DataStorageManager (DSM) 555 are considered part of the data provisioning 350 of FIG. 3.

The VNac actuation type 240 sends actuation commands to execute in the physical infrastructure 395. Thus, the VNac 240 invokes the SAM component 168 using an IPUT interface 560.

The VNse sensing type 235 performs tasks requiring the acquisition of raw sensing data. The VNse 235 interacts with the DSM for retrieving the data streams from historical databases maintained at the edge tier 330. The VNse 235 can also invoke the SAM component 168 using an IGET interface 565 whenever the data freshness of the stored data does not meet one or more target QoS requirements. In this case, fresh data must be acquired from the physical nodes at the Sensor tier 390.

The VNdf data fusion type 220 provides processed data. To fulfill this task, the VNdf 220 interacts with the data handler component 550. The data handler component 550 abstracts the complexity of executing queries over sensed data. Moreover, the data handler component 550 obtains the data stream from the DataStorageManager (DSM) 555 through an IEvent interface 570.

The VNcache cache type 225 is a subtype of VNdf 220 that adds the capability of persisting the results of an information/aggregation function in memory, for future reuse.

The VNuf user function type 215 also interacts with the DataStorageManager (DSM) 555 for retrieving the data from historical databases. However, the VNuf 215 performs user functions (UF) 575 (e.g., injected code, such as application specific functions), obtained using an IUF interface 578, over data before returning the output data to the application.

Finally, VNevent VN event type 230 implements an asynchronous process to notify an application or another VN whenever an event of interest occurs. For this, the VNevent implements a queue in order to receive data from the DataStorageManager (DSM) 555 and send the data to the application, for example, using a callback.

Regarding the interaction with the Sensor tier 390, the SAM 168 is a central component, in some embodiments, in charge of managing the interactions. The SAM 168 provides connectors for abstracting the heterogeneity of the physical objects/devices and allowing the interaction with them.

Devices or IoT objects 175 include, but are not limited to: smart sensors of several types, home appliances, alarm systems, heating and air conditioning, lighting, industrial machines, irrigation systems, drones, traffic signals, automated transportation, and so forth. The connector 580 for the IoT objects 175 is a component that encompasses, in some embodiments: (i) a driver interface responsible for interaction with the physical device, (ii) services for data transformations, and (iii) handlers for servicing requests.

Figure 6:
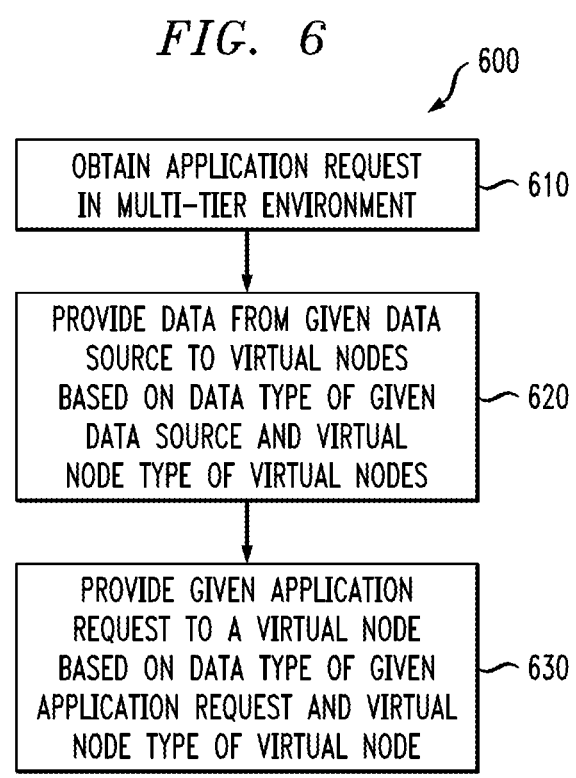
FIG. 6 is a flow chart illustrating an exemplary implementation of a resource management process, according to at least one embodiment of the disclosure.

FIG. 6 is a flow chart illustrating an exemplary implementation of a resource management process 600, according to at least one embodiment of the disclosure. As shown in FIG. 1, the exemplary resource management process 600 initially obtains an application request in a multi-tier environment during step 610. As discussed above, the exemplary multi-tier environment comprises cloud resources and/or edge nodes. In some embodiments, the edge nodes and/or one or more of the cloud resources host a plurality of virtual nodes to process the application requests. Generally, each of the virtual nodes corresponds to a given predefined virtual node type.

During step 620, the exemplary resource management process 600 provides data from a given data source to at least two of virtual nodes based on a data type of the given data source and the virtual node type of the at least two virtual nodes.

Finally, during step 630, the exemplary resource management process 600 provides a given application request to at least one virtual node based on a data type of the given application request and the virtual node type of the at least one virtual node. The at least one virtual node provides data in response to the application requests to one or more corresponding applications and/or one or more additional virtual nodes.

In some embodiments, the disclosed edge-cloud computing systems provide a lightweight virtualization approach, to deal with the resource constraints of edge devices. One exemplary virtualization approach is based on containers and microservices, thus providing a virtualization model with low overhead.

Moreover, a data-centric approach is also provided, in which the virtual nodes are defined based on the data (either raw data or processed data), instead of on virtual machines or processing cores. Therefore, resources offered by the edge-cloud infrastructure, as well as application requests issued by end users, in at least some embodiments, are described based on the data to be provided/consumed.

The disclosed data-centric virtualization model optionally leverages data reutilization among different applications with similar requirements in terms of data sources, thus promoting higher return-of-investments for infrastructure providers. The exemplary virtualization model in one or more embodiments provides several built-in types of virtual nodes that support the definition of different types of data-driven resources that are managed by the edge-cloud infrastructure. The definition of data-centric virtual nodes allows for various types of granularity in the content of a node, in order to promote either the reuse (sharing) of resources either the fulfillment of application-specific requirements.

A virtual node can optionally be specified to be tailored to the requirements of a single specific application, an application domain, or represent a generic function of data fusion or event detection. This feature helps dealing with the high heterogeneity of application requirements in edge-cloud systems.

The disclosed software framework addresses the inherent challenges of the resource management in edge-cloud ecosystems, as described above. The specified software components and description of their behavior will provide the underpinnings and well-formed guidelines for building concrete resource management systems for these systems.

The disclosed distributed, hierarchical approach to the framework and supporting collaboration between edge nodes of one or more embodiments enable addressing the challenges of large-scale, device heterogeneity, resource constraints, and also helps meeting application privacy requirements. Hierarchical approaches are well known for minimizing coordination overhead in large-scale systems, since master nodes are responsible for controlling their slave nodes, and message exchange is restricted to a smaller region, rather than requiring dissemination through all the nodes of the system.

One or more aspects of the disclosure leverage the heterogeneity of nodes, in order to assign the role of masters only to nodes with greater capacity of resources. Regarding security requirements, the high availability of data produced by end-user IoT devices raises privacy issues. For example, analyzing photos and videos generated by a smart phone can help identify terrorist attacks or other public safety situations. Being able to have such data to be consumed by data analytics applications in the cloud can bring countless benefits not only to the device owner but to the community as a whole. Therefore, on one hand, it is important to share this data, but on the other hand, such information is often private and/or confidential and cannot be disseminated blindly. One challenge is to maintain user privacy while provisioning such analysis services. The disclosed hierarchical approach can be extended to address this challenge. Each user can register her or his devices on a local edge node, which would be considered, for example, a private edge node of the respective user, and provide computing and storage capabilities. The raw data generated by the user would be associated with virtual machines instantiated on the private edge node, which could optionally filter, preprocess and/or anonymize the relevant data, if needed, before passing the data to higher levels of the hierarchy for further analysis.

One or more embodiments of the disclosure provide improved methods, apparatus and computer program products for providing a resource management framework in an edge-cloud environment. The foregoing applications and associated embodiments should be considered as illustrative only, and numerous other embodiments can be configured using the techniques disclosed herein, in a wide variety of different applications.

It should also be understood that the disclosed resource management framework, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for providing a resource management framework may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform-as-a-Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based resource management framework, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based resource management platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. These platforms may also be used to implement at least portions of other information processing systems in other embodiments.

Figure 7:
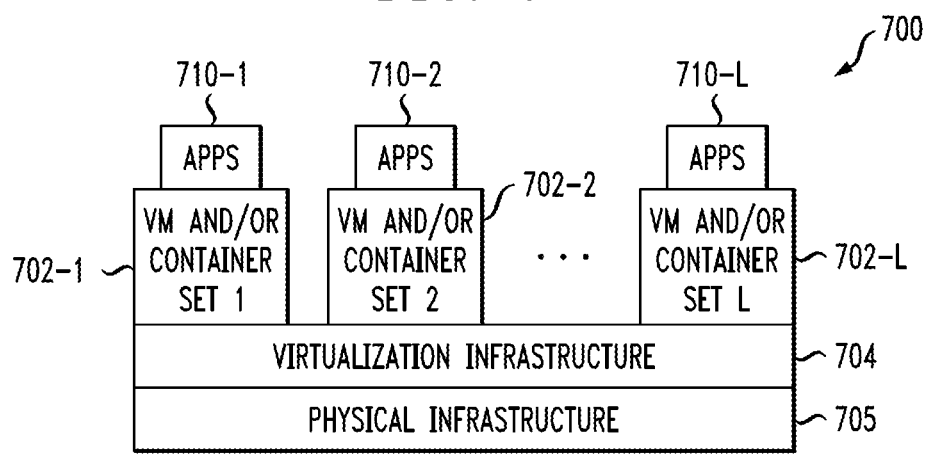
FIG. 7 illustrates an exemplary processing platform that may be used to implement at least a portion of one or more embodiments of the disclosure comprising a cloud infrastructure.

FIG. 7 shows an example processing platform comprising cloud infrastructure 700. The cloud infrastructure 700 comprises a combination of physical and virtual processing resources that may be utilized to implement at least a portion of an information processing system. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. Such implementations can provide resource management framework functionality of the type described above for one or more processes running on a given one of the VMs. For example, each of the VMs can implement resource management control logic for providing the resource management framework functionality for one or more processes running on that particular VM.

An example of a hypervisor platform that may be used to implement a hypervisor within the virtualization infrastructure 704 is the VMware® vSphere® which may have an associated virtual infrastructure management system such as the VMware® vCenter™. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system. Such implementations can provide resource management functionality of the type described above for one or more processes running on different ones of the containers. For example, a container host device supporting multiple containers of one or more container sets can implement one or more instances of resource management logic for use in providing the resource management framework.

As is apparent from the above, one or more of the processing modules or other components of the edge-cloud system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises at least a portion of the given system and includes a plurality of processing devices, denoted 802-1, 802-2, 802-3, . . . 802-K, which communicate with one another over a network 804. The network 804 may comprise any type of network, such as a wireless area network (WAN), a local area network (LAN), a satellite network, a telephone or cable network, a cellular network, a wireless network such as WiFi or WiMAX, or various portions or combinations of these and other types of networks. In an implementation for the edge of the Internet, one or more of the devices can be implemented, for example, using a Dell Edge Gateway™ device, commercially available from Dell Inc. of Round Rock, Tex.

The processing device 802-1 in the processing platform 800 comprises a processor 810 coupled to a memory 812. The processor 810 may comprise a microprocessor, a microcontroller, an application specific integrated circuit (ASIC), a field programmable gate array (FPGA) or other type of processing circuitry, as well as portions or combinations of such circuitry elements, and the memory 812, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and the given system may include additional or alternative processing platforms, as well as numerous distinct processing platforms in any combination, with each such platform comprising one or more computers, storage devices or other processing devices.

Figure 8:
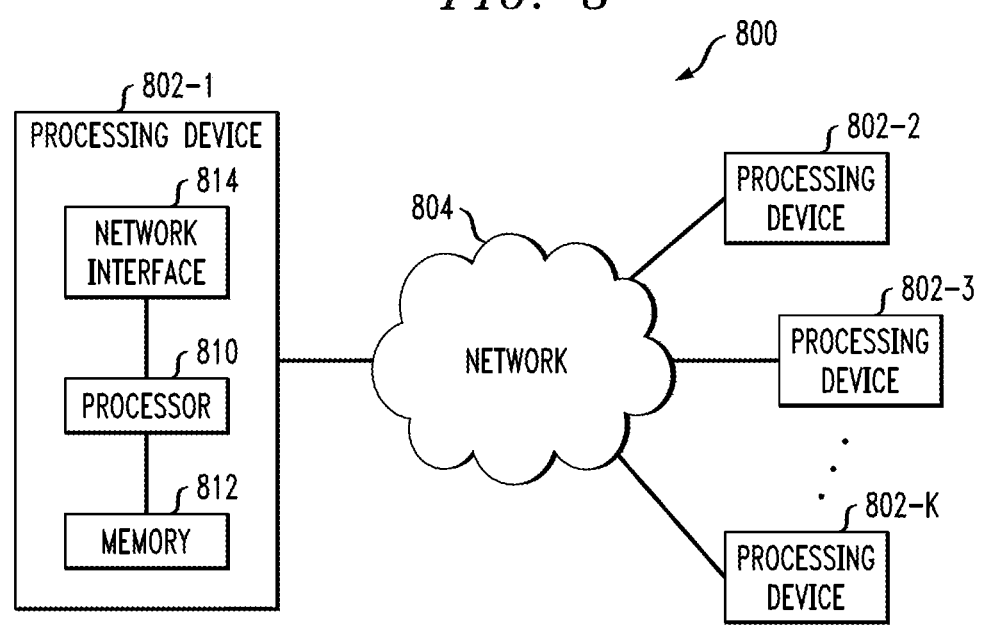
FIG. 8 illustrates another exemplary processing platform that may be used to implement at least a portion of one or more embodiments of the disclosure.

Multiple elements of an information processing system may be collectively implemented on a common processing platform of the type shown in FIG. 7 or 8, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
    obtaining at least one application request in a multi-tier environment comprising one or more cloud resources and a plurality of edge nodes, wherein the plurality of edge nodes host a plurality of virtual nodes to process the one or more application requests, and wherein each of the plurality of virtual nodes generates output data of a single data type of a plurality of data types employed in the multi-tier environment and corresponds to a given one of a plurality of virtual node types, wherein the plurality of virtual node types comprises at least one of a user function virtual node type, a data fusion virtual node type, a caching virtual node type, an event virtual node type, a sensing virtual node type, and an actuation virtual node type;
    providing, using at least one processing device, data from a given data source to one or more of the plurality of virtual nodes based at least in part on the data type of the given data source and the virtual node type of the one or more virtual nodes, wherein the virtual node type of a given virtual node is based on the data type of the output data generated by the given virtual node; and
    providing, using the at least one processing device, a given application request to at least one of the plurality of virtual nodes based at least in part on the data type of a result of the given application request and the virtual node type of the at least one virtual node, wherein the at least one virtual node provides data in response to the one or more application requests to one or more of: corresponding applications and one or more additional virtual nodes.

2. The method of claim 1, wherein the given data source comprises one or more of a sensor and an Internet of Things device.

3. The method of claim 1, wherein the edge nodes are grouped into a plurality of edge node groups and wherein each edge node group comprises at least one master node, and wherein at least two master nodes from different edge node groups collaborate to identify a given edge node group that can serve a given application request.

4. The method of claim 1, wherein one or more components of the plurality of edge nodes are implemented using one or more of at least one microservice and at least one container.

5. The method of claim 1, wherein the at least one virtual node abstracts one or more of computation capabilities and communication capabilities provided by one or more of the edge nodes.

6. The method of claim 1, wherein the at least one virtual node is a software instance providing data in response to one or more application requests at one or more of an edge of a public network and the cloud.

7. The method of claim 1, wherein the step of providing the given application request to the at least one virtual node further comprises the step of instantiating the at least one virtual node to process the one or more application requests based on the data type of the given application request, the virtual node type of the at least one virtual node and an availability of the required virtual node instance into a physical node repository.

8. The method of claim 1, further comprising the step of updating the data based on an evaluation of a time-stamp of the data from a data repository with respect to a data freshness constraint posed by an application.

9. A computer program product, comprising a tangible machine-readable storage medium having encoded therein executable code of one or more software programs, wherein the one or more software programs when executed by at least one processing device perform the following steps:
obtaining at least one application request in a multi-tier environment comprising one or more cloud resources and a plurality of edge nodes, wherein the plurality of edge nodes host a plurality of virtual nodes to process the one or more application requests, and wherein each of the plurality of virtual nodes generates output data of a single data type of a plurality of data types employed in the multi-tier environment and corresponds to a given one of a plurality of virtual node types, wherein the plurality of virtual node types comprises at least one of a user function virtual node type, a data fusion virtual node type, a caching virtual node type, an event virtual node type, a sensing virtual node type, and an actuation virtual node type;
providing data from a given data source to one or more of the plurality of virtual nodes based at least in part on the data type of the given data source and the virtual node type of the one or more virtual nodes, wherein the virtual node type of a given virtual node is based on the data type of the output data generated by the given virtual node; and
providing a given application request to at least one of the plurality of virtual nodes based at least in part on the data type of a result of the given application request and the virtual node type of the at least one virtual node, wherein the at least one virtual node provides data in response to the one or more application requests to one or more of: corresponding applications and one or more additional virtual nodes.

10. The computer program product of claim 9, wherein the edge nodes are grouped into a plurality of edge node groups and wherein each edge node group comprises at least one master node, and wherein at least two master nodes from different edge node groups collaborate to identify a given edge node group that can serve a given application request.

11. The computer program product of claim 9, wherein the at least one virtual node abstracts one or more of computation capabilities and communication capabilities provided by one or more of the edge nodes.

12. The computer program product of claim 9, wherein the at least one virtual node is a software instance providing data in response to one or more application requests at one or more of an edge of a public network and the cloud.

13. The computer program product of claim 9, wherein the step of providing the given application request to the at least one virtual node further comprises the step of instantiating the at least one virtual node to process the one or more application requests based on the data type of the given application request, the virtual node type of the at least one virtual node and an availability of the required virtual node instance into a physical node repository.

14. The computer program product of claim 9, further comprising the step of updating the data based on an evaluation of a time-stamp of the data from a data repository with respect to a data freshness constraint posed by an application.

15. An apparatus, comprising:
a memory; and
at least one processing device, coupled to the memory, operative to implement the following steps:
obtaining at least one application request in a multi-tier environment comprising one or more cloud resources and a plurality of edge nodes, wherein the plurality of edge nodes host a plurality of virtual nodes to process the one or more application requests, and wherein each of the plurality of virtual nodes generates output data of a single data type of a plurality of data types employed in the multi-tier environment and corresponds to a given one of a plurality of virtual node types, wherein the plurality of virtual node types comprises at least one of a user function virtual node type, a data fusion virtual node type, a caching virtual node type, an event virtual node type, a sensing virtual node type, and an actuation virtual node type;
providing data from a given data source to one or more of the plurality of virtual nodes based at least in part on the data type of the given data source and the virtual node type of the one or more virtual nodes, wherein the virtual node type of a given virtual node is based on the data type of the output data generated by the given virtual node; and
providing a given application request to at least one of the plurality of virtual nodes based at least in part on the data type of a result of the given application request and the virtual node type of the at least one virtual node, wherein the at least one virtual node provides data in response to the one or more application requests to one or more of: corresponding applications and one or more additional virtual nodes.

16. The apparatus of claim 15, wherein the edge nodes are grouped into a plurality of edge node groups and wherein each edge node group comprises at least one master node, and wherein at least two master nodes from different edge node groups collaborate to identify a given edge node group that can serve a given application request.

17. The apparatus of claim 15, wherein the at least one virtual node abstracts one or more of computation capabilities and communication capabilities provided by one or more of the edge nodes.

18. The apparatus of claim 15, wherein the at least one virtual node is a software instance providing data in response to one or more application requests at one or more of an edge of a public network and the cloud.

19. The apparatus of claim 15, wherein the step of providing the given application request to the at least one virtual node further comprises the step of instantiating the at least one virtual node to process the one or more application requests based on the data type of the given application request, the virtual node type of the at least one virtual node and an availability of the required virtual node instance into a physical node repository.

20. The apparatus of claim 15, further comprising the step of updating the data based on an evaluation of a time-stamp of the data from a data repository with respect to a data freshness constraint posed by an application.

* * * * *